United States Patent
Harsha et al.

(10) Patent No.: US 12,488,279 B2
(45) Date of Patent: Dec. 2, 2025

(54) DOMAIN-SPECIFIC CONSTRAINTS FOR PREDICTIVE MODELING

(71) Applicant: INTERNATIONAL BUSINESS MACHINES CORPORATION, Armonk, NY (US)

(72) Inventors: Pavithra Harsha, White Plains, NY (US); Brian Leo Quanz, Yorktown Heights, NY (US); Shivaram Subramanian, Frisco, TX (US); Wei Sun, Tarrytown, NY (US); Max Biggs, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 1338 days.

(21) Appl. No.: 17/135,913

(22) Filed: Dec. 28, 2020

(65) Prior Publication Data
US 2022/0207412 A1    Jun. 30, 2022

(51) Int. Cl.
*G06N 20/00*    (2019.01)
*G06F 18/211*    (2023.01)

(52) U.S. Cl.
CPC .......... *G06N 20/00* (2019.01); *G06F 18/211* (2023.01)

(58) Field of Classification Search
CPC ...... G06N 3/096; G06N 3/0985; G06N 20/00; G06N 3/082; G06N 3/045; G06F 18/211
See application file for complete search history.

(56) References Cited

U.S. PATENT DOCUMENTS

| | | | |
|---|---|---|---|
| 5,002,313 | A | 3/1991 | Salvatore |
| 7,072,852 | B1 | 7/2006 | Kamille |
| 7,451,123 | B2 | 11/2008 | Platt et al. |
| 8,280,768 | B2 | 10/2012 | Davis |
| 9,965,770 | B2 | 5/2018 | Mason-Gugenheim et al. |
| 11,281,969 | B1 | 3/2022 | Rangapuram et al. |
| 11,900,222 | B1 * | 2/2024 | Alakuijala ............. G06N 20/20 |
| 12,165,057 | B2 | 12/2024 | Harsha et al. |

(Continued)

OTHER PUBLICATIONS

Borghesi et al., "Improving Deep Learning Models via Constraint-Based Domain Knowledge: a Brief Survey," arXiv:2005.10691v1 [cs.LG] May 19, 2020 (Year: 2020).*

(Continued)

*Primary Examiner* — Miranda M Huang
*Assistant Examiner* — Yao David Huang
(74) *Attorney, Agent, or Firm* — CHIP LAW GROUP (57) ABSTRACT

A machine learning system that incorporates arbitrary constraints is provided. The machine learning system selects a set of domain-specific constraints from a plurality of sets of domain-specific constraints. The machine learning system selects a set of general functional relationships from a plurality of sets of general functional relationships. The machine learning system maps the selected set of general functional relationships and the selected set of domain-specific constraints to a set of learning transforms. The machine learning system modifies a machine learning specification according to the set of learning transforms, wherein the machine learning specification specifies a model construction, a model setup, and a training objective function. The machine learning system optimizes a machine learning model according to the modified machine learning specification.

14 Claims, 4 Drawing Sheets

(56) References Cited

U.S. PATENT DOCUMENTS

| | | |
|---|---|---|
| 2006/0224533 A1 | 10/2006 | Thaler |
| 2012/0158474 A1 | 6/2012 | Fahner et al. |
| 2012/0330867 A1 | 12/2012 | Gemulla et al. |
| 2013/0006738 A1 | 1/2013 | Horvitz et al. |
| 2013/0006744 A1 | 1/2013 | Redford et al. |
| 2013/0006750 A1 | 1/2013 | Simmons, Jr. |
| 2013/0024261 A1 | 1/2013 | Main et al. |
| 2013/0041737 A1 | 2/2013 | Mishra et al. |
| 2013/0073372 A1 | 3/2013 | Novick et al. |
| 2014/0156568 A1* | 6/2014 | Ganguly ............ G06Q 10/0637 706/12 |
| 2015/0100402 A1 | 4/2015 | Gadotti |
| 2015/0205759 A1 | 7/2015 | Israel et al. |
| 2017/0011416 A1 | 1/2017 | Vaysman |
| 2017/0161640 A1 | 6/2017 | Shamir |
| 2017/0300814 A1 | 10/2017 | Shaked et al. |
| 2018/0107925 A1 | 4/2018 | Choi et al. |
| 2019/0130218 A1* | 5/2019 | Albright ............... G06V 10/772 |
| 2019/0171908 A1 | 6/2019 | Salavon |
| 2019/0172082 A1 | 6/2019 | Ganti Mahapatruni et al. |
| 2019/0180303 A1 | 6/2019 | Ventrice et al. |
| 2020/0026996 A1 | 1/2020 | Kolter et al. |
| 2020/0175395 A1* | 6/2020 | Kathiresan ................ G06F 8/36 |
| 2020/0234374 A1 | 7/2020 | Bawadhankar et al. |
| 2021/0081848 A1* | 3/2021 | Polleri ................ G06F 11/3409 |
| 2021/0097052 A1* | 4/2021 | Hans ...................... G06N 5/022 |
| 2021/0150259 A1* | 5/2021 | Dasgupta ............. G06F 18/217 |
| 2021/0295175 A1* | 9/2021 | Kennel ................. G06F 18/214 |
| 2021/0334664 A1* | 10/2021 | Li ........................ G06V 30/413 |
| 2022/0207413 A1 | 6/2022 | Harsha et al. |
| 2022/0230065 A1* | 7/2022 | Berthelot ............... G06N 3/045 |
| 2022/0366218 A1* | 11/2022 | Parisotto ................ G06N 3/048 |
| 2023/0141655 A1* | 5/2023 | Gonzalez ............... G06N 3/045 706/13 |
| 2023/0154055 A1 | 5/2023 | Besenbruch et al. |
| 2023/0385603 A1* | 11/2023 | Arikawa .................. G06N 3/04 |

OTHER PUBLICATIONS

Bedi, J. et al., "Deep Learning Framework to Forecast Electricity Demand"; Applied Energy (2019); vol. 238; pp. 1312-1326.

Carbonneau, R. et al., "Application of Machine Learning Techniques for Supply Chain Demand Forecasting"; European Journal of Operational Research (2008); vol. 184; pp. 1140-1154.

Ke, J. et al., "Short-Term Forecasting of Passenger Demand under On-Demand Ride Services: A Spatio-Temporal Deep Learning Approach"; arXiv:1706.06279v1 [cs.LG] (2017); 39 pgs.

Qiu, X. et al., "Empirical Mode Decomposition based Ensemble Deep Learning for Load Demand Time Series Forecasting"; Applied Soft Computing (2017); 40 pgs.

Yao, H. et al., "Deep Multi-View Spatial-Temporal Network for Taxi Demand Prediction"; The Thirty-Second AAAI Conference on Artificial Intelligence (2018); pp. 2588-2595.

Cheng, H.-T et al. monet,"Wide & Deep Learning for Recommender Systems", In Proceedings of the 1st Workshop on Deep Learning for Recommender Systems (2016), pp. 7-10.

List of IBM Patents or Patent Applications Treated as Related, 2 pgs.

Kilroy, J. et al., "Method and System for Exchanging and Trading Online Coupons"; IP.Com (2011); 4 pgs.

* cited by examiner

DOMAIN-SPECIFIC CONSTRAINTS FOR PREDICTIVE MODELING

BACKGROUND

Technical Field

The present disclosure generally relates to predictive modeling.

Description of the Related Arts

Deep Learning, or DL, is a multi-layer neural network and associated with technology in Artificial Intelligence (AI), enabling many new and improved applications dominating research and applications in recent years. Deep Learning enables flexible modeling that models arbitrary underlying processes more accurately than traditional methods. Deep Learning has enabled obtaining state-of-the-art results for a variety of predictive tasks and applications in many domains (e.g., image classification, text classification, language modeling, translation, game playing through reinforcement learning beating world champions, etc.,) with less effort to design models and features.

In recent years, deep learning is also being used more frequently in applications for predictive modeling to drive processes and systems, as more and more data becomes available and desired to be included in predictive modeling to drive an industry process. Nevertheless, many obstacles remain when applying DL to real industry problems and industry behaviors involving constraints specific to different industry domains. For example, in demand planning, price is a key factor for predicting demand, and there are known relationships such as that increased price leads to decreased demand. The price-demand relationships need to be captured directly to manage multiple processes and systems such as predicting demand for different prices, e.g., for the purposes of price optimization (determining what are the optimal prices to set). On the other hand, in service workforce management, there are known relationships such as adding more workers reduces the risks of work ticket violations, having more skilled workers reduces number of workplace incidents and service time, etc.

The chief difficulty in applying DL to industry problems is that there is no way to enforce known industry constraints in the deep learning modeling and there is not enough available data to accurately learn the known behavior. Such functional constraints specific to a domain cannot be directly incorporated into DL models because DL models work by learning multi-layer neural nets, which have complex functional forms and derivatives. Incorporating domain-specific constraints may lead to a learning problem too inefficient and difficult to optimize. DL models that are more powerful and accurate often do not respect industry constraints and generalize incorrectly, leading to poor, bizarre, and incorrect decisions. For example, it is typical for deep learning and flexible machine learning standard approaches to generate unreasonable models in which demand or purchase propensity increases with increasing price. Consequently, applications often make do with weaker, less accurate models for which the constraints can be incorporated.

SUMMARY

Some embodiments of the disclosure provide a machine learning system that includes arbitrary constraints. The machine learning system selects a set of domain-specific constraints from a plurality of sets of domain-specific constraints. The machine learning system selects a set of general functional relationships from a plurality of sets of general functional relationships. The machine learning system maps the selected set of general functional relationships and the selected set of domain-specific constraints to a set of learning transforms. The machine learning system modifies a machine learning specification according to the set of learning transforms, wherein the machine learning specification specifies a model construction, a model setup, and a training objective function. The machine learning system optimizes a machine learning model according to the modified machine learning specification. In some embodiments, the system optimizes the machine learning model by performing stochastic gradient descent according to the model construction, the model setup, and/or the training objective function that is/are modified by the set of learning transforms.

In some embodiments, the system selects the set of domain-specific constraints and the set of general functional relationships by mapping a user indication of an industry application to the set of domain-specific constraints and the set of general functional relationships. The system may modify the model construction by e.g., identifying input elements to be split in a network, adding a new node in an intermediate layer, adding new connection, adding new output, etc. The system may modify the training objective function by e.g., augmenting a base loss function with an additional (penalty) loss function. The system may augment a training dataset for the model setup to accommodate additional inputs, outputs, and/or to add samples to the training dataset.

In some embodiments, the model construction includes a deep learning model having one or more intermediate layers, and the system modifies the machine learning specification according to the set of learning transforms by adding a wide learning model having no intermediate learning layer to the model construction. The deep learning model may be unconstrained (non-parametric) and the wide learning model may be constrained (parametric) according to the selected set of general functional relationships.

By converting selected domain-specific constraints and general functional relationships into transformations of model constructs, model setup procedures, and/or training objective functions of a machine learning model, arbitrary constraints (e.g., industry constraints) and known relationships can be incorporated into deep learning. A more automatic, accurate, scalable and efficient predictive modeling system that generalizes correctly to unseen data, to drive downstream industry systems and processes is therefore realized.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

When implementing arbitrary constraints in machine learning, typically, traditional, "weaker" approaches that use simple parametric (e.g., generalized linear) model are used so constraints can be easily incorporated in learning with a modified formulation/optimization problem that can be easily solved. With linear models, many of the industry constraints often amount to simple linear constraints on the parameters so they can be efficiently learned as part of a convex or efficiently solvable non-convex optimization problem. The challenge is to implement arbitrary constraints in deep learning (DL) models so to be able to take advantage of its ability to learn complex functions from many variables but not be restricted to a fixed parametric form which may be unrealistic and do not match the underlying data.

DL functions are highly non-linear and non-convex, which includes a chain of non-linear transformations. Similarly, the derivative of a neural net model with respect to any input is also a deeply nested, highly non-linear/non-convex function. Consequently, directly applying constraints to DL as with simple models is very difficult if not impossible, as the optimization problem to be solved would then become intractable and very difficult to solve, and standard DL optimization techniques like stochastic gradient descent could no longer be used. On the other hand, in real life industry applications, constraints to capture multiple assumed behaviors are getting more and more complicated and varied such as when there are multiple different functional constraints.

Some embodiments of the disclosure provide a machine learning system that enables industries in multiple domains to leverage the power of deep learning for more efficient, automatic, accurate, and scalable predictive modeling, but have no way to incorporate industry constraints for their applications. The machine learning system facilitates incorporation of industry constraints and known relationships in deep learning to enable more automatic, accurate, scalable and efficient predictive modeling that generalizes correctly to unseen data, to drive downstream industry systems and processes. Specifically, the machine learning system provides sets of pre-canned constraints known to be used for different domains. In some embodiments, the system also provides an interface to let users add or adjust functional constraints and/or relationships.

Figure 1:
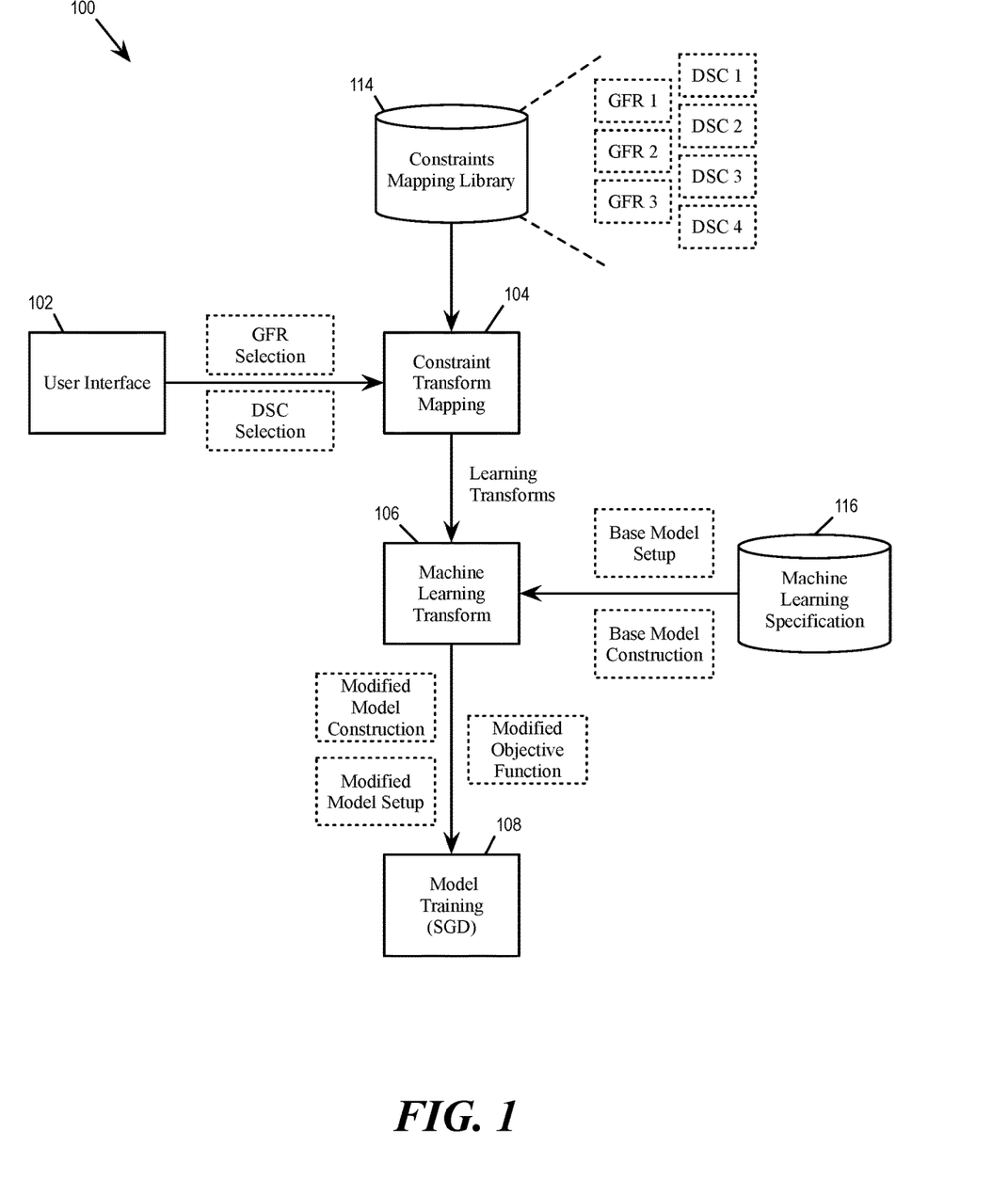
FIG. 1 illustrates a machine learning system in which constraints of different constraints can selectively incorporated into a deep learning model.

FIG. 1 illustrates a machine learning system 100 in which constraints of different industry constraints can selectively be incorporated into a DL model, consistent with an illustrative embodiment. The system includes a user interface module 102, a constraint mapping module 104, a machine learning transform module 106, and a model training module 108.

In some embodiments, a computing system of one or more computing devices implement the machine learning system 100. In some embodiments, the modules 102-108 are modules of software instructions being executed by one or more processing units (e.g., a processor) of the computing devices. In some embodiments, the modules 102-108 are modules of hardware circuits implemented by one or more integrated circuits (ICs) of an electronic apparatus. Though the modules 102, 104, 106, and 108 are illustrated as being separate modules, some of the modules can be combined into a single module. For example, the functionalities of the constraint mapping module 104 can be merged into the machine learning transform module 106. An example computing device 400 that may implement the machine learning system 100 will be described by reference to FIG. 4 below.

The user interface module 102 lets users add or adjust functional constraints and/or relationships. In some embodiments, the user interface module 102 allows the selection of a set of domain-specific constraints from multiple different sets of domain-specific constraints (e.g., industry types) and a set of general functional relationships from multiple sets of general functional relationships. A set of domain-specific constraints can be constraints that are known to be common to a type of industry (e.g., demand should not increase if price increases). A general functional relationship specifies the mathematical or logical relationship between variables. These constraints are "general" as they may be applicable to any number of different industry domains.

The user interface module 102 may provide a list of possible domains (e.g., demand planning industry, healthcare industry, workforce management industry, etc.,) and a list of general functional relationships (e.g., gradient constraints, convex/concave relationships, steady state behavior, modality constraints, multi-variable relationship constraints, etc.,) for the user to choose from. The user interface module 102 may also provide a list of industries for the user to choose from, and the user interface module 102 may then in turn translate the chosen industry into selections of domain-specific constraints and general functional relationships. The user interface module 102 may also allow a user to build new patterns by selecting variables and classes of relation components (domain-specific constraints and general functional relationships) or specifying parameters that are particular to the user's application.

The constraint mapping module 104 maps the selected set of functional relationships and the selected set of domain-specific constraints to a set of learning transforms. In some embodiments, each functional relationship (representing; known industry constraints) has an associated set routine to transform it to a specific modification of the network (model) structure and/or specific model fitting optimization setup and procedure. The constraint mapping module 104 translates relational components, via mathematical approaches, to model construction and fitting optimization problems (e.g., as new loss functions to be included in a training objective function; new model architecture with model parameter constraints, etc.). In some embodiments, the constraint mapping module 104 uses the selection provided by the user interface module 102 to retrieve from a constraint mapping library 114 the information for implementing the selected domain-specific constraints and/or general functional relationships. The constraint mapping library 114 stores information for implementing each of the multiple different sets of domain-specific constraints and each of the multiple different sets of general functional relationships are stored in a constraint mapping library 114. In the figure, "DSC 1", "DSC 2", etc., correspond to information for implementing domain-specific constraints of different domains in the machine learning system 100. On the other hand, "GFR 1", "GFR 2", etc., correspond to information for implementing general functional relationships of different types in the machine learning system 100. Information for implementing one or more sets of the domain-specific constraints and/or one or more sets of the general functional relationships are retrieved from the constraint library 114 and forwarded to the constraint mapping module 106 as a set of learning transforms to be implemented on a machine learning model.

The machine learning transform module 106 modifies a machine learning specification 116 according to the set of learning transforms. In some embodiments, the machine learning specification 116 specifies a model construction, a model setup procedure, and an objective function for constructing a machine learning model, and the machine learning transform module 106 may modify the machine learning specification 116 by transforming the model construction, the model setup procedure, and/or the loss function according to the set of learning transforms.

For example, the machine learning transform module 106 may modify the model construction of the machine learning specification 116 by identifying input elements to be split in a network, adding a new node in an intermediate layer, adding new connection, and/or adding new output. The machine learning transform module 106 may modify the objective function by augmenting a base loss function with an additional penalty loss function. The machine learning transform module 106 may modify the model set up procedure by augmenting a training dataset that is used for setting up the machine learning model by e.g., accommodating additional inputs and/or outputs and adding additional training samples. In some embodiments, the machine learning specification 116 specifies a deep learning model having one or more intermediate layers, and the machine learning transform module 106 adds a wide learning model having no intermediate learning layer to the model construction. The deep learning model is unconstrained (non-parametric) and the wide learning model is constrained (parametric) according to the selected set of functional relationships.

The model training module 108 performs stochastic gradient descent (SGD) to build a machine learning model according to the modified machine learning specification generated by the machine learning transform module 106. The machine learning model has a model construction, a model setup procedure, and/or a training objective function that are transformed or modified by a set of learning transforms that implements the selected domain-specific constraints and general functional relationships. During the SGD operation, the transformed model setup procedure (e.g., modified training set) is used to train the machine learning model, which has a structure according to the transformed model construction. The SGD relies on the transformed training objective function to compute weightings or parameters of the machine learning model.

Figure 2:
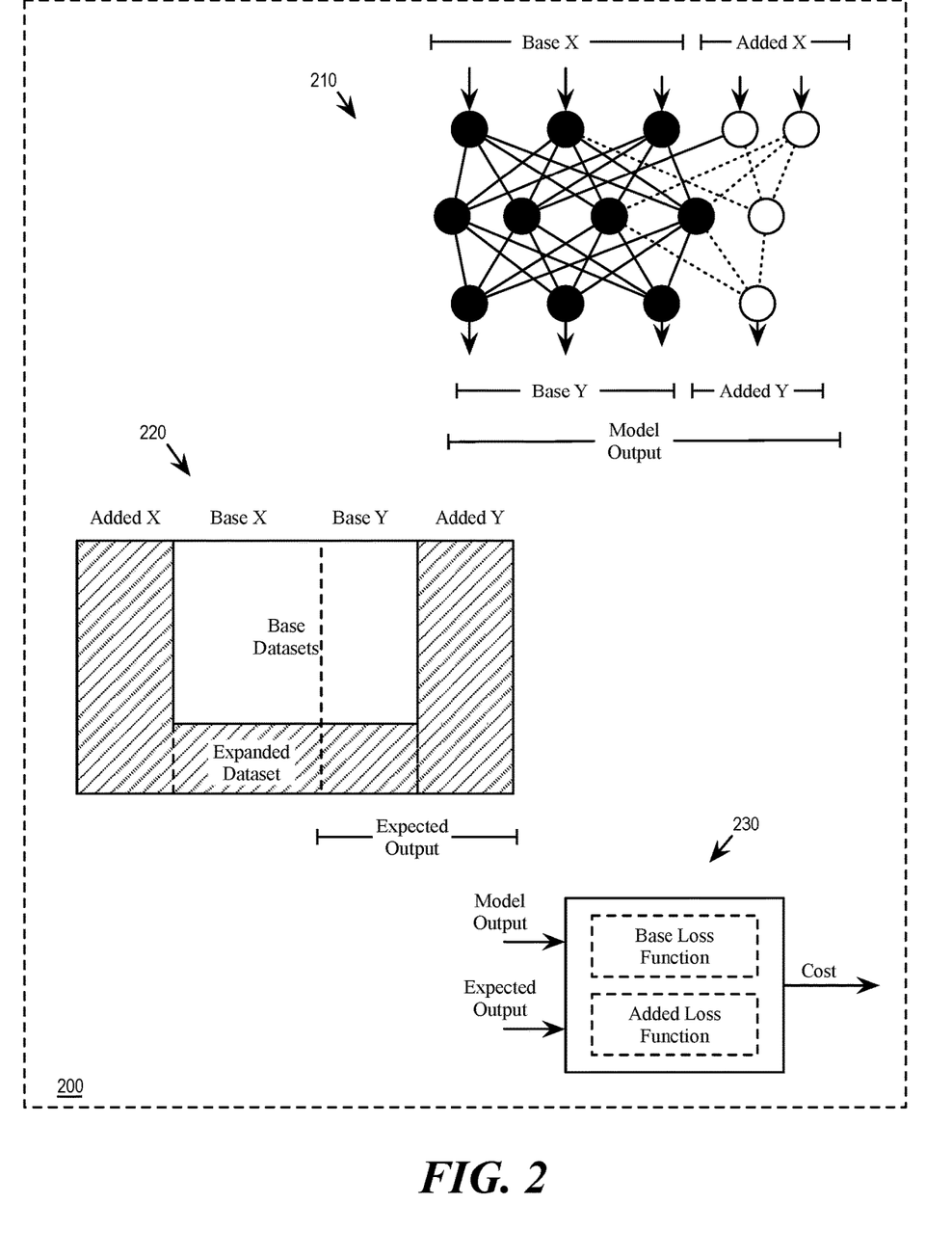
FIG. 2 conceptually illustrates an example set of learning transforms for modifying a machine learning specification.

FIG. 2 conceptually illustrates an example set of learning transforms 200 for modifying a machine learning specification. The set of learning transforms includes a model construction transform 210, a model setup procedure transform 220, and an objective function transform 230. As illustrated, the model construction transform 210 specifies additional input layer nodes ("added X"), additional output layer nodes ("added Y"), additional intermediate layer nodes, and additional connections that corresponds to the selected domain-specific constraints and general functional relationships. The model setup procedure transform 220 specifies additional training data, including those for the additional input and output variables that correspond to the selected domain-specific constraints and general functional relationships. The objective function transform 230 specifies changes to the objective function (also referred to as loss function or cost function) that is used to train the machine learning model, e.g., by adding an additional loss function term based on the added variables for implementing the selected domain-specific constraints and general functional relationships. The resulting optimization problem is solved with stochastic gradient descent with the modifications to how the model is setup, how the training is conducted (e.g., in terms of how the sampling is done), how the objective function is computed, and/or how the gradient descent step is performed.

Figure 3:
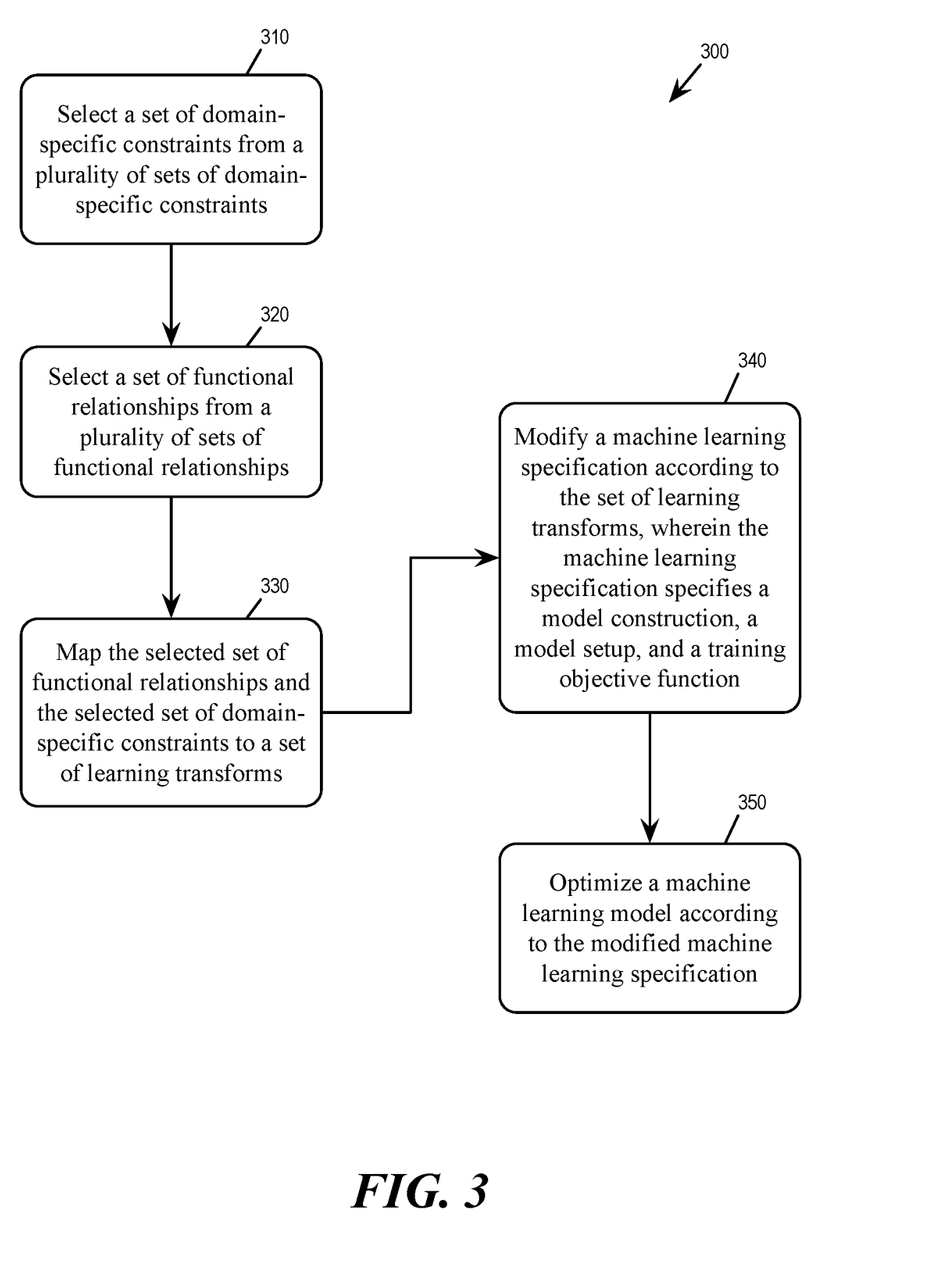
FIG. 3 conceptually illustrates a process for building a machine learning model based on specified constraints, consistent with an illustrative embodiment.

FIG. 3 conceptually illustrates a process 300 for building a machine learning model based on specified industry constraints, consistent with an illustrative embodiment. In some embodiments, one or more processing units (e.g., processor) of a computing device implementing the machine learning system 100 perform the process 300 by executing instructions stored in a computer readable medium.

The machine learning system selects (at block 310) a set of domain-specific constraints from multiple sets of domain-specific constraints (e.g., industry types). The machine learning system also selects (at block 320) a set of general functional relationships from multiple sets of general functional relationships. In some embodiments, the system selects the set of domain-specific constraints and the set of general functional relationships by mapping a user indication of a industry application to the set of domain-specific constraints and the set of general functional relationships.

The machine learning system maps (at block 330) the selected set of general functional relationships and the selected set of domain-specific constraints to a set of learning transforms. The machine learning system modifies (at block 340) a machine learning specification according to the set of learning transforms. The machine learning specification specifies a model construction, a model setup, and a training objective function. The system may modify the model construction by e.g., identifying input elements to be split in a network, adding a new node in an intermediate layer, adding new connection, adding new output, etc. The system may modify the training objective function by e.g., augmenting a base loss function with an additional (penalty) loss function. The system may augment a training dataset for the model setup (to accommodate additional inputs, outputs, and/or to add samples to the training dataset).

In some embodiments, the model construction includes a deep learning model having one or more intermediate layers, and the system modifies the machine learning specification according to the set of learning transforms by adding a wide learning model having no intermediate learning layer to the model construction. The deep learning model may be unconstrained (non-parametric) and the wide learning model may be constrained (parametric) according to the selected set of general functional relationships.

The machine learning system optimizes (at block 350) a machine learning model according to the modified machine learning specification. The system optimizes the machine learning model by performing stochastic gradient descent according to the model construction, the model setup, and/or the training objective function that is/are modified by the set of learning transforms.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 3) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
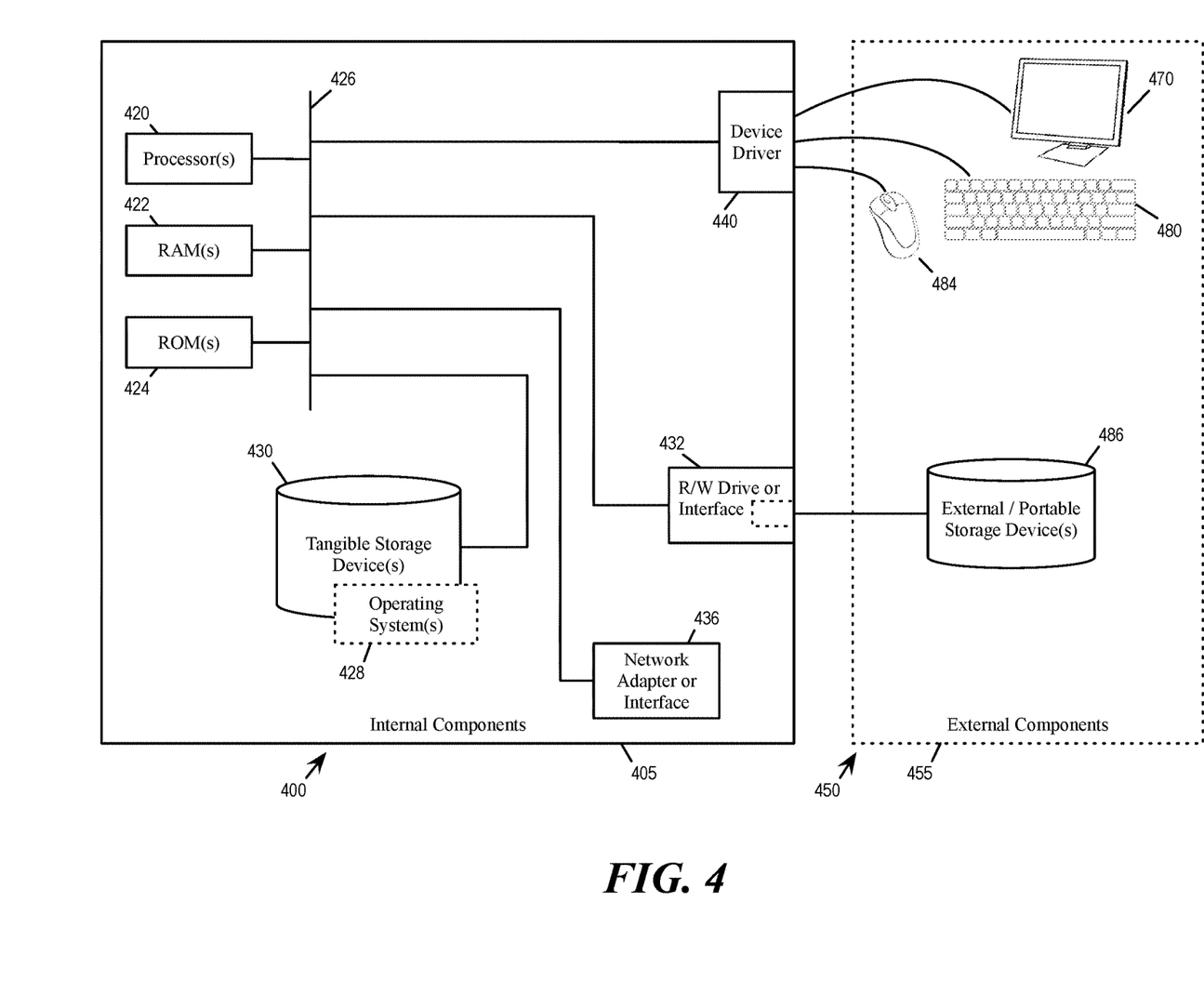
FIG. 4 shows a block diagram of the components of a data processing system in accordance with an illustrative embodiment of the present disclosure.

FIG. 4 shows a block diagram of the components of data processing systems 400 and 450 that may be used to implement a machine learning system in accordance with an illustrative embodiment of the present disclosure. It should be appreciated that FIG. 4 provides only an illustration of one implementation and does not imply any limitations with regard to the environments in which different embodiments may be implemented. Many modifications to the depicted environments may be made based on design and implementation requirements.

Data processing systems 400 and 450 are representative of any electronic device capable of executing machine-readable program instructions. Data processing systems 400 and 450 may be representative of a smart phone, a computer system, PDA, or other electronic devices. Examples of computing systems, environments, and/or configurations that may represented by data processing systems 400 and 450 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 400 and 450 may include a set of internal components 405 and a set of external components 455 illustrated in FIG. 4. The set of internal components 405 includes one or more processors 420, one or more computer-readable RAMs 422 and one or more computer-readable ROMs 424 on one or more buses 426, and one or more operating systems 428 and one or more computer-readable tangible storage devices 430. The one or more operating systems 428 and programs such as the programs for executing the process 300 are stored on one or more computer-readable tangible storage devices 430 for execution by one or more processors 420 via one or more RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

The set of internal components 405 also includes a R/W drive or interface 432 to read from and write to one or more portable computer-readable tangible storage devices 486 such as a CD-ROM, DVD, memory stick, magnetic tape, magnetic disk, optical disk or semiconductor storage device. The instructions for executing the process 300 can be stored on one or more of the respective portable computer-readable tangible storage devices 486, read via the respective R/W drive or interface 432 and loaded into the respective hard drive 430.

The set of internal components 405 may also include network adapters (or switch port cards) or interfaces 436 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 436. From the network adapters (or switch port adaptors) or interfaces 436, the instructions and data of the described programs or processes are loaded into the respective hard drive 430. The network may comprise copper wires, optical fibers, wireless transmission, routers, firewalls, switches, gateway computers and/or edge servers.

The set of external components 455 can include a computer display monitor 470, a keyboard 480, and a computer mouse 484. The set of external components 455 can also include touch screens, virtual keyboards, touch pads, pointing devices, and other human interface devices. The set of internal components 405 also includes device drivers 440 to interface to computer display monitor 470, keyboard 480 and computer mouse 484. The device drivers 440, R/W drive or interface 432 and network adapter or interface 436 comprise hardware and software (stored in storage device 430 and/or ROM 424).

The foregoing one or more embodiments implements a machine learning system by having one or more computing devices storing and/or determining the information used to transform a machine learning model for implementing sets of domain-specific constraints and general functional relationships. The computer infrastructure is further used to optimize (by e.g., perform stochastic gradient descent) the transformed machine learning model.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computing device, comprising:
a processor; and
a storage device storing a set of instructions, wherein an execution of the set of instructions by the processor configures the computing device to:
  receive a selection of an industry from a plurality of industries via a user interface;
  translate the selection of the industry into a selection of a set of domain-specific constraints and a selection of a set of general functional relationships, wherein
    the set of domain-specific constraints is selected from a plurality of sets of domain-specific constraints in a constraint mapping library,
    the selected set of domain-specific constraints defines relationships specific to the selected industry,
    the set of general functional relationships is selected from a plurality of sets of general functional relationships, and
    each general functional relationship of the set of general functional relationships defines a transformation applicable to machine learning model construction;
  map the selected set of general functional relationships and the selected set of domain-specific constraints to a set of learning transforms;

modify a machine learning specification according to the set of learning transforms, wherein
the machine learning specification specifies a model construction, a model setup, and a training objective function, and
the modification of the machine learning specification comprises:
modifying the model construction by addition of a wide learning model to a non-parametric deep learning model; and
modifying the training objective function by adding an additional loss function for implementing the selected set of domain-specific constraints;
construct a machine learning model based on the modified machine learning specification such that the machine learning model includes the additional loss function and the wide learning model; and
optimize, based on the constructed machine learning model, the machine learning model by determining weights of connections between nodes of the machine learning model.

2. The computing device of claim 1, wherein the modification of the machine learning specification according to the set of learning transforms further comprises augmenting a training dataset for the model setup.

3. The computing device of claim 1, wherein the model construction comprises the non-parametric deep learning model having one or more intermediate layers.

4. The computing device of claim 3, wherein the modification of the machine learning specification according to the set of learning transforms further comprises adding the wide learning model having no intermediate learning layer to the model construction.

5. The computing device of claim 4, wherein
the non-parametric deep learning model is unconstrained with respect to the selected set of general functional relationships, and
the wide learning model is constrained with respect to the selected set of general functional relationships.

6. The computing device of claim 1, wherein the optimization of the machine learning model comprises performing stochastic gradient descent based on to at least one of the model construction, the model setup, or the training objective function that is modified by the set of learning transforms.

7. A computer-implemented method, comprising:
receiving a selection of an industry from a plurality of industries via a user interface;
translating the selection of the industry into a selection of a set of domain-specific constraints and a selection of a set of general functional relationships, wherein
the set of domain-specific constraints is selected from a plurality of sets of domain-specific constraints in a constraint mapping library,
the selected set of domain-specific constraints defines relationships specific to the selected industry,
the set of general functional relationships is selected from a plurality of sets of general functional relationships, and
each general functional relationship of the set of general functional relationships defines a transformation applicable to machine learning model construction;
mapping the selected set of general functional relationships and the selected set of domain-specific constraints to a set of learning transforms;
modifying a machine learning specification according to the set of learning transforms, wherein
the machine learning specification specifies a model construction, a model setup, and a training objective function, and
the modifying of the model construction comprises:
modifying the model construction by addition of a wide learning model to a non-parametric deep learning model; and
modifying the training objective function by adding an additional loss function for implementing the selected set of domain-specific constraints;
constructing a machine learning model based on the modified machine learning specification such that the machine learning model includes the additional loss function and the wide learning model; and
optimizing, based on the constructed machine learning model, the machine learning model by determining weights of connections between nodes of the machine learning model.

8. The computer-implemented method of claim 7, wherein the modifying of the machine learning specification according to the set of learning transforms further comprises augmenting a training dataset for the model setup.

9. The computer-implemented method of claim 7, wherein the model construction comprises the non-parametric deep learning model having one or more intermediate layers.

10. The computer-implemented method of claim 9, wherein the modifying of the machine learning specification according to the set of learning transforms further comprises adding the wide learning model having no intermediate learning layer to the model construction.

11. The computer-implemented method of claim 10, wherein
the non-parametric deep learning model is unconstrained with respect to the selected set of general functional relationships, and
the wide learning model is constrained with respect to the selected set of general functional relationships.

12. The computer-implemented method of claim 7, wherein the optimizing of the machine learning model comprises performing stochastic gradient descent based on at least one of the model construction, the model setup, or the training objective function that is modified by the set of learning transforms.

13. A computer program product comprising:
one or more non-transitory computer-readable storage devices and program instructions stored on at least one of the one or more non-transitory computer-readable storage devices, the program instructions executable by a processor, cause the processor to perform:
receiving a selection of an industry from a plurality of industries via a user interface;
translating the selection of the industry into a selection of a set of domain-specific constraints and a selection of a set of general functional relationships, wherein
the set of domain-specific constraints is selected from a plurality of sets of domain-specific constraints in a constraint mapping library,
the selected set of domain-specific constraints defines relationships specific to the selected industry,
the set of general functional relationships is selected from a plurality of sets of general functional relationships, and each general functional relationship of the set of general functional relationships defines a transformation applicable to machine learning model construction;

mapping the selected set of general functional relationships and the selected set of domain-specific constraints to a set of learning transforms;

modifying a machine learning specification according to the set of learning transforms, wherein the machine learning specification specifies a model construction, a model setup, and a training objective function, and the modifying of the model construction comprises:

modifying the model construction by addition of a wide learning model to a non-parametric deep learning model; and modifying the training objective function by adding an additional loss function for implementing the selected set of domain-specific constraints;

constructing a machine learning model based on the modified machine learning specification such that the machine learning model includes the additional loss function and the wide learning model; and optimizing, based on the constructed machine learning model, the machine learning model by determining weights of connections between nodes of the machine learning model.

14. The computer program product of claim 13, wherein the optimizing of the machine learning model comprises performing stochastic gradient descent based on at least one of the model construction, the model setup, or the training objective function that is modified by the set of learning transforms.

* * * * *